April 29, 1941.   C. A. WATKINS ET AL   2,240,429
SHOE SOLING MACHINE
Filed June 22, 1938    5 Sheets-Sheet 2
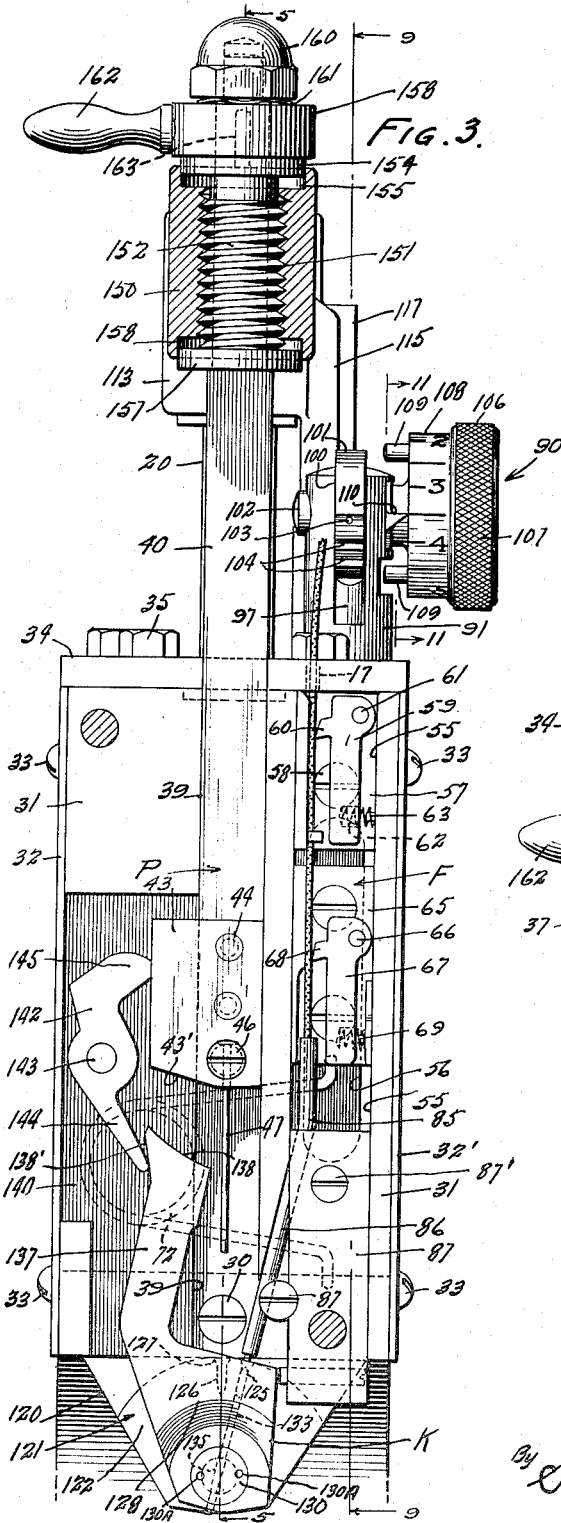
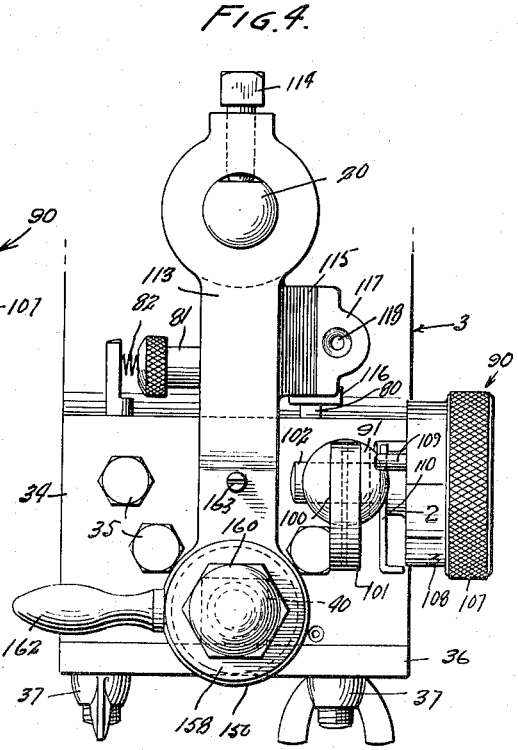
Inventors
CHARLES A. WATKINS
JOHN G. WRIGHT &
CLIFFORD T. HARRIS
By Semmes, Keegin & Semmes
Attorneys

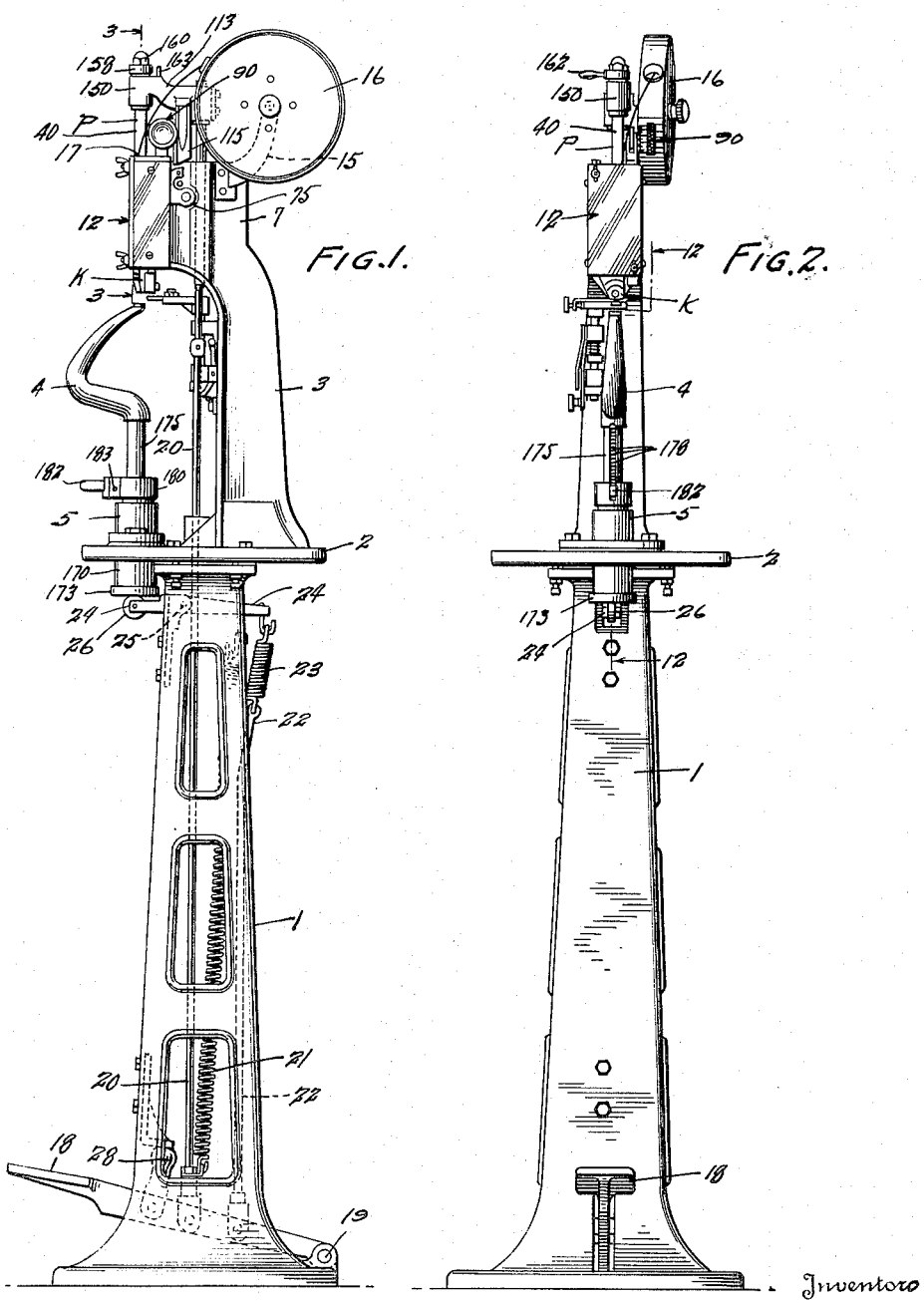

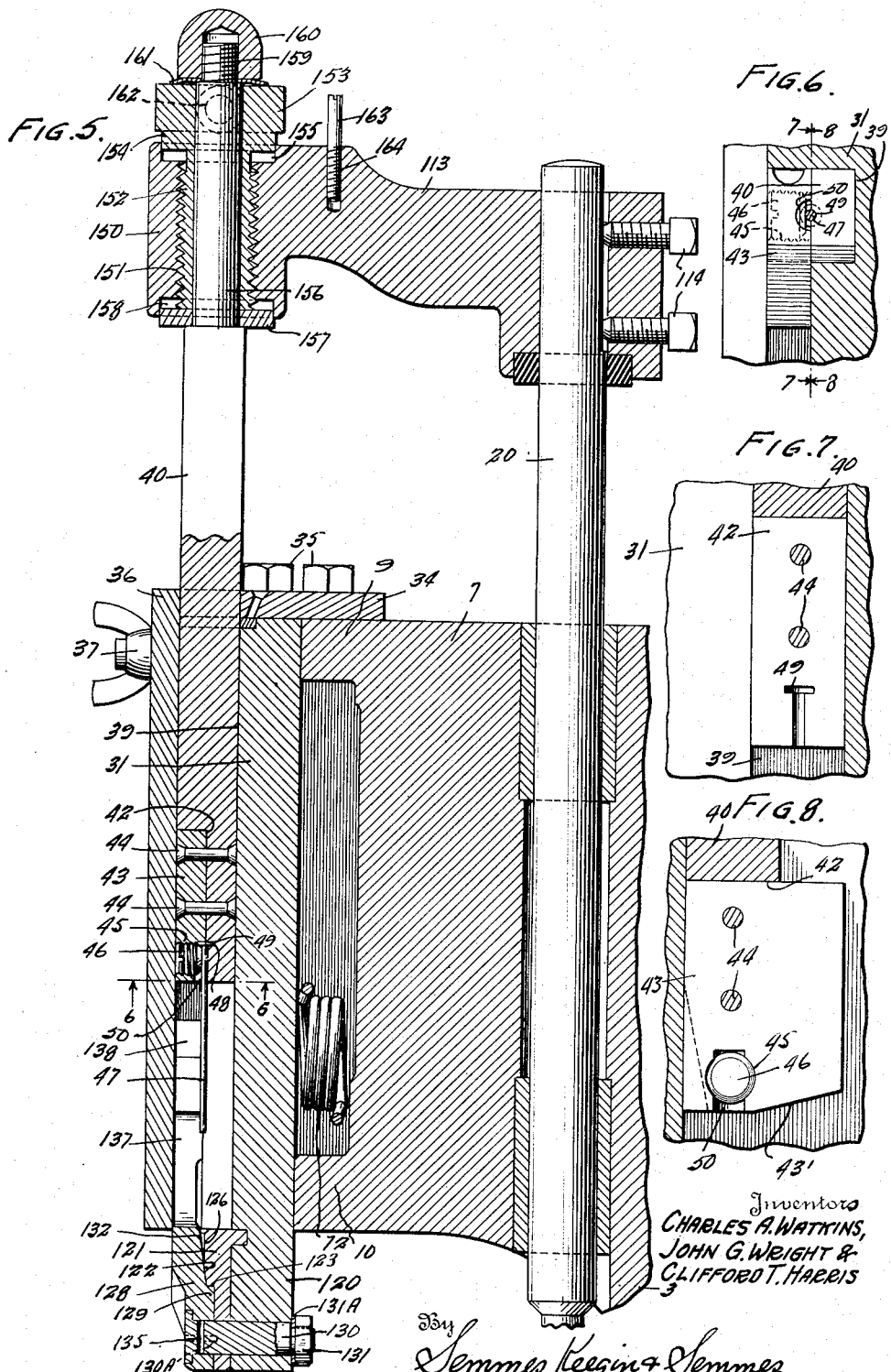

April 29, 1941.  C. A. WATKINS ET AL  2,240,429
SHOE SOLING MACHINE
Filed June 22, 1938  5 Sheets-Sheet 4
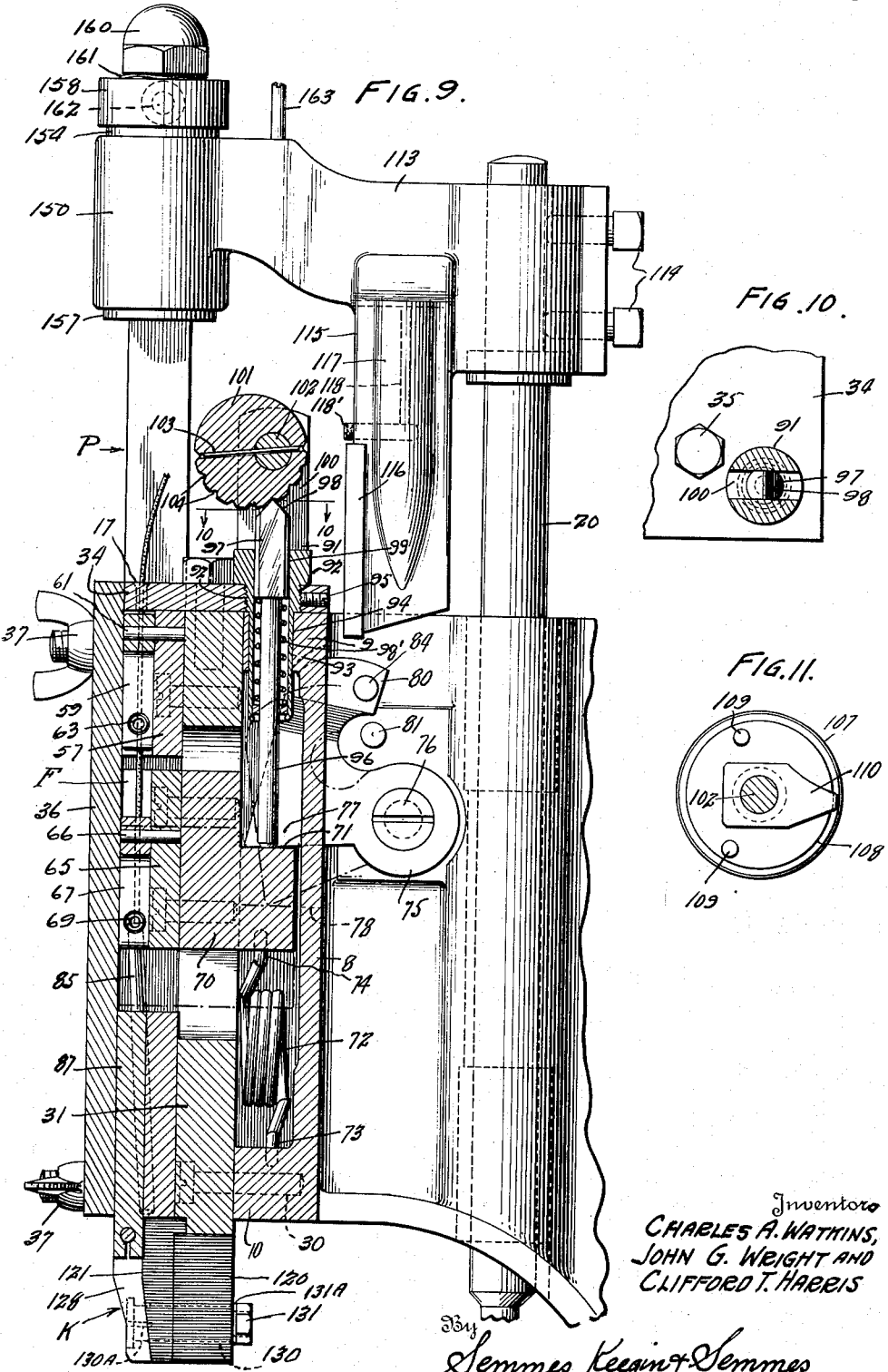
Inventors
CHARLES A. WATKINS,
JOHN G. WRIGHT AND
CLIFFORD T. HARRIS
By Semmes, Keegin & Semmes
Attorneys

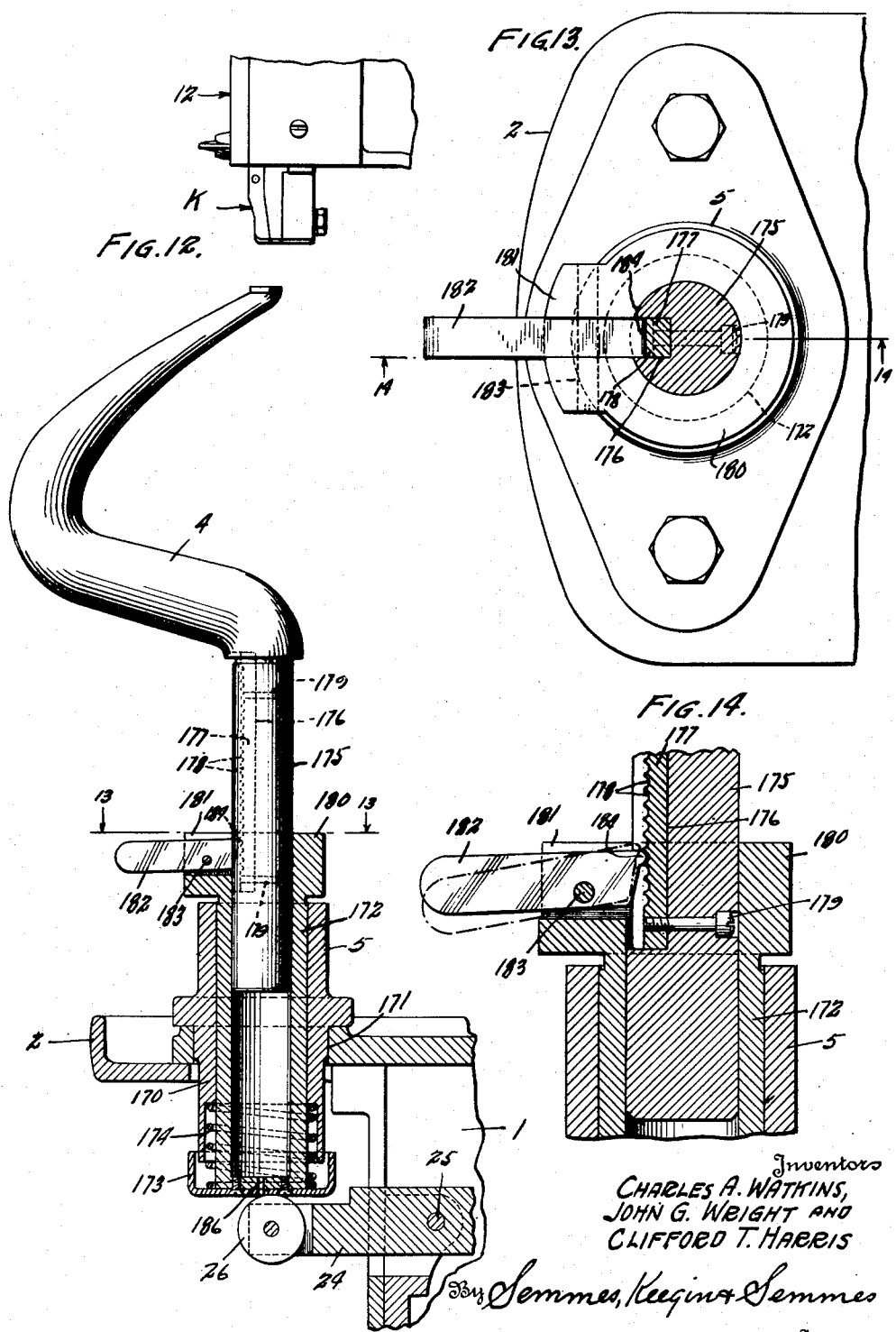

Patented Apr. 29, 1941

2,240,429

UNITED STATES PATENT OFFICE 2,240,429

SHOE SOLING MACHINE

Charles A. Watkins, John G. Wright, and Clifford T. Harris, Atlanta, Ga., assignors to The Auto Soler Company, Atlanta, Ga.

Application June 22, 1938, Serial No. 215,234

2 Claims. (Cl. 1—41)

This invention relates to a machine for uniting layers of materials and more particularly has reference to a machine for uniting layers of material, such as, for instance, the soles of shoes. It is, of course, obvious that the invention is of much broader scope and can be employed for securing boxes, crates and the like. The machine covered in the present application is generally similar to the apparatus disclosed in Davis J. Ajouelo et al. application, Serial No. 210,266, filed May 26, 1938, but includes numerous improved features.

An important object of the present invention is to provide a machine for making and inserting fasteners into layers of material which embodies means for feeding the wire to the cutting mechanism, maintaining the wire against retraction and controlling the feeding mechanism to determine and vary the lengths of the fastener members.

Another object of the present invention is to provide a machine for making and inserting fasteners into layers of materials, which is provided with means for varying the length of the wire to be fed to the feeding mechanism which is simple in construction and operation.

Yet another object of this invention is to provide a machine for making and inserting metallic fasteners into layers of material to be united, the anvil or horn of which can be quickly and easily adjusted to suit any given situation.

Still another object of this invention is to provide a machine for making and inserting fasteners into layers of material to be united which includes means whereby the countersink of the fastener inserting mechanism can be regulated.

Yet still another object of the present invention is to provide a machine for making and inserting metallic fasteners into layers of materials to be united in which the fastener is formed, inserted and clinched in the materials to be united by a single operation on the part of the operator.

To achieve the above and other important objects, the present invention embraces generally the idea of providing a machine in which metallic fasteners are formed from a continuous strand of wire. The machine includes a wire feeding mechanism, a fastener inserting mechanism and a cutting mechanism which are synchronously associated and a single operation on the part of the operator causes each of the mechanisms to perform its respective function. More specifically, the instant invention provides means whereby the counter-sink of the fastener inserting member into the materials to be united can be quickly and easily regulated. Also, the horn or anvil on which is supported the material to be united is provided with means by which this member can be readily adjusted. In addition, the present machine embodies a mechanism simple in construction and operation by which the length of the wire fed to the feeding mechanism can be varied.

In order to make our invention more easily understood, there is shown in the accompanying drawings, means for carrying the same into practical effect without limiting the improvements in their useful applications to the particular construction, which for the purpose of explanation, have been made the subject of illustration.

In the drawings in which like numerals indicate similar parts:

Figure 1 is a side elevational view showing our machine for making and inserting metallic fasteners.

Figure 2 is a front elevational view of the machine in Figure 1.

Figure 3 is a view taken along line 3—3 of Figure 1 looking in the direction of the arrows.

Figure 4 is a top plan view of the housing containing the feeding, cutting and inserting mechanisms.

Figure 5 is a view taken along line 5—5 of Figure 3 looking in the direction of the arrows.

Figure 6 is a view taken along line 6—6 of Figure 5 looking in the direction of the arrows.

Figure 7 is a view taken along line 7—7 of Figure 6 looking in the direction of the arrows.

Figure 8 is a view taken along line 8—8 of Figure 6 looking in the direction of the arrows.

Figure 9 is a view taken along line 9—9 of Figure 3 looking in the direction of the arrows.

Figure 10 is a view taken along line 10—10 of Figure 9 looking in the direction of the arrows.

Figure 11 is a view taken along line 11—11 of Figure 3 looking in the direction of the arrows.

Figure 12 is a view taken along line 12—12 of Figure 2 looking in the direction of the arrows.

Figure 13 is a view taken along line 13—13 of Figure 12 looking in the direction of the arrows.

Figure 14 is a view taken along line 14—14 of Figure 13 looking in the direction of the arrows.

Referring to the drawings and more particularly to Figure 1, there is illustrated a machine for making and inserting metallic fasteners comprising a base 1, a shelf 2 adjacent the top of the base 1, and an upright bracket 3 carried by the shelf. A vertically movable anvil or horn 4 is supported in a sleeve 5 which extends through an aperture in the shelf 2. The horn 4 is adjustable to accommodate different shapes and sizes of shoes as will hereinafter be more fully discussed.

The bracket 3 terminates in a head 7 having lateral flanges 8 and horizontally extending portions 9 and 10 in the upper and lower ends of the head as shown in Figure 5. A housing or casing designated generally 12 is removably attached to the head 7 and contains a wire feeding mechanism F, a plunger or fastener inserting mechanism P, and a knife or fastener forming mechanism K.

Carried on a bracket 15 attached to the head 7 is a casing 16 in which is rotatably mounted a reel of wire adapted to be guided into the housing 12 as shown at 17.

The feeding, plunger and cutting mechanisms F, P and K, respectively, together with the horn 4, are operated by a treadle or foot pedal 18 that is pivoted at the base 1 as indicated at 19. An operating rod 20 is suitably pivoted to the pedal 18. A spring 21 associated at one end with the treadle 18 and at its opposite end to the base 1 tends to urge normally the operating rod 20 upwardly as illustrated in Figure 1.

A second rod 22 is also pivoted to the pedal 18. Attached to the upper end of the rod 22 is one end of a spring 23 which has its other end disposed over a hook carried by an operating arm 24. The arm 24 is pivoted as shown at 25 in a bracket suitably secured to the inner wall of the base 1. A roller 26 is mounted in a bifurcated end of the arm 24 and is disposed beneath the horn 4 as best shown in Figure 12.

As will later become more readily apparent, when pressure is applied to the treadle 18, the feeder, plunger and cutting mechanisms, together with the horn will be operated simultaneously. To limit the the upward movement of the treadle 18 and the control rod 20, there is provided a stop mechanism designated 28. The stop mechanism 28 is preferably of the shock absorbing type. Not only will this structure serve as a limit for the upward stroke of the control rod 20, but also it will reduce the shock and vibration caused by the release of the treadle 18.

Attached to the horizontal portion 10 by a screw 30 is the lower portion of a head casting designated 31 which serves as a support and guide for the wire feeding, plunger and cutting mechanisms F, P and K. In Figure 3 it can be seen that side plates 32 and 32' are attached to the casting by screws 33 and a top plate 34 is affixed to the casting 31 as shown at 35. A face plate 36 is removably secured on the casting 31 by means of wing nuts 37.

The casting 31 is grooved throughout its length as shown at 39 to provide a guideway for a plunger 40 that is slidably mounted therein. The plunger 40 is, of course, a portion of the plunger mechanism P. Referring to Figure 5, it will be noted that the extremity of the plunger 40 is cut away at 42 to receive a block 43 which is attached thereto by rivets 44. In Figure 3 it can be seen that the block is provided at one end thereof with a cam surface 43'. The block 43 is also provided with a screw-threaded aperture 45 into which is screwed a screw 46. A plunger point 47 having a head 48 fits into a recess 49 formed in the reduced end portion 42 of the plunger 40. The block 43 is also provided with an arcuate cutaway portion 50 of such size as to accommodate the head 48 of the point 47. It can be clearly seen from Figure 5 that when the screw 46 is screwed into the aperture 45, the beveled end thereof will bear against the head 48 and the shank of the point 47 thereby holding the plunger point in proper position. In the event it becomes necessary to remove the plunger point, the screw 46 is rotated in counter direction, thereby freeing the plunger head 48 and the plunger point 47 can be readily removed. Manifestly, this construction is of great importance, since it will enable the plunger point to be easily removed for the purposes of repair, replacement or cleaning.

Referring again to Figure 3, it can be seen that the casting 31 is also cut away adjacent the area 39 as shown at 55 and is further provided with an elongated aperture 56. Positioned in the portion 55 is a block 57 which is secured to the casting by a screw 58. A hold-back key 59 having a wire engaging projection 60 is pivoted to the block 57 as shown at 61. The key is recessed at 62 to form a seat for one end of a coil spring 63, the other end of which is suitably attached to the side wall of the groove 55. The spring 63 will hold the projection 60 in contact with a strand of wire, thereby preventing the retraction of the wire unless the projection moves out of engagement therewith.

The wire feeding mechanism includes a bracket 65 slidably mounted in the groove 55 below the block 57. Pivoted to the bracket 65 at 66 is also a feeder blade 67 having an offset portion 68 which is adapted to engage the wire. A spring construction 69 similar to spring 63 holds the projection 68 in engagement with the wire as shown in Figure 3.

Referring now to Figure 9, it can be seen that there is attached to the rear surface of the bracket 65, an extension feeder block 70 which is adapted to move the feeder bracket 65 and which extends rearwardly through the aperture 56. The extension feeder block 70 is cutaway to form a ledge 71. A spring 72 having one end secured in the horizontal member 10 as shown at 73 and the other end fixed to the extension feeder block 70 as shown at 74 will normally maintain a feeding mechanism in an elevated position.

The extension feeder block 70 together with the feeder bracket 65 is moved downwardly by means of a feeder cam 75. The feeder cam 75 is pivotally mounted to the head 7 by means of a screw 76. The cam is further provided with an extension 77 which projects through an aperture 78 in the rear portion of the head 7 and engages the ledge 71. As shown in Figure 9 the cam is formed with an offset portion 80 and a latch 81 which slides through an aperture in the head 7 will prevent the cam from moving too far in a rearwardly direction. A spring 82 associated with the latch 81 will keep the latch in the position shown in Figure 4. However, by pulling on the head of the latch 81, it may be withdrawn from the position shown in Figure 9 against the action of the spring and permit the cam to be completely moved back about its pivot 76 and out of engagement with the extension feeder block 70. To facilitate manual operation of the cam, a finger engaging pin 84 is provided on the offset portion 80. As will later become more readily appreciated, by thus moving the cam, the wire feeding mechanism F may be thrown out of operation.

A wire guide tube 85, the lower portion of which extends diagonally as shown at 86, is mounted at the lower end of the groove 55 (see Figure 3). A plate 87 having a grooved portion into which the tube 85 fits is positioned thereover and secured to the casting 31 by screws 87'. The tube 85 will guide the wire to the cutting mechanism K after it has been advanced the proper distance by the feeding mechanism F.

As hereinbefore stated, an important feature of the present invention is to provide means by which the length of each fastener can be varied at the will of the operator of the machine. This is accomplished by adjustably limiting the upward movement of the feeder blade 67 and its associated parts. By reference to Figures 3 and 9 it will be noted that a feeder adjusting mechanism indicated generally 90 is suitably disposed on the top cover plate 34. An upright support member 91 is screwed into an aperture 92 formed in the top cover plate 34. The member 91 is provided with an integral reduced extension 93 which projects through aperture 94 formed in the horizontal portion 9 of the head 7. A screw 95 is screwed into the cover plate 34 and bears against the screw-threaded portion of the member 95 to hold the support in proper position. A plunger pin 96 having an enlarged head 97 provided with beveled edges 98 extends through a bore 99 in the member 91. The lower end of the plunger rod 96 is adapted to rest on the ledge 71 of the feeder extension block 70. A coil spring 98' is fitted around the rod 96 and urges the plunger head 97 upwardly.

As shown in Figure 3, the support 91 is bifurcated as shown at 100, and an eccentric 101 is mounted therein on a shaft 102 which extends through aligned apertures in the support 91. A pin 103 secures the eccentric to the shaft 102. It should be noted that the eccentric is provided with a plurality of rounded teeth 104 into which is adapted to project the beveled portions 98 of the plunger head 97. It is believed obvious, therefore, that when the eccentric 101 is rotated, the position of the feeder bracket 65 will be varied due to the position of the plunger 96. Of course, the feeder mechanism F will be raised or lowered the necessary distance depending upon the direction of rotation of the eccentric 101.

In order to facilitate rotation of the eccentric 101 it can be seen in Figure 3 that the shaft 102 carries at its outer end, an operating knob 106. The knob 106 is preferably formed with a knurled portion 107 to enable the fingers of the operator to readily move the knob. There is also provided on the knob, a graduated scale 108 to aid the operator in determining the length of the fastener required. In order to limit the rotary movement of the control button 106, there is provided a pair of pins 109 which engage a segment 110 carried by the support 91.

Briefly, the wire feeding mechanism F is actuated as follows. When the foot pedal 18 is depressed, the control rod 20 is moved downwardly which in turn pulls down a cross-head 113 attached to the upper end thereof as shown at 114. A feeder arm 115 having a hardened wearing surface 116 is secured to the cross-head. A blister 117 is formed on the feeder arm 115 and an oil duct 118 having a wick 118' is provided therein for lubricating the wearing surface 116.

Manifestly, when the cross-head 113 is moved downwardly, the feeder arm 115 will likewise be moved and engage the offset portion 68 of the cam 75. The extension 77 of the cam which bears against the ledge 71 of the extension feeder block 70 will move the same downwardly the required distance and simultaneously with this movement of the extension block the offset portion 68 of the feeder blade will bite into the wire and move it downwardly a distance which is equal to the downward stroke of the feeder mechanism F. When the feeder arm 115 has thus moved the wire feeding mechanism, during the intial movement of the operating rod 20, the wearing surface 116 will slide over the offset extension 68 of the cam 75, permitting no further movement of the feeder mechanism. In this manner, the operating rod 20 may continue in its downward stroke to perform subsequent functions as will be described. Immediately upon completion of the downward stroke of the operating mechanism and by release of foot pressure on the treadle 18, the same will be moved upwardly and when the wearing surface 116 has again passed the offset 68, the spring 72 will urge the feeder block 70 back to its normal position where the plunger pin 96 bears against the ledge 71. The feeding mechanism F is then in position for another operation.

The lower end of the casting 31 is provided with a substantially V-shaped extension 120 on which is mounted a stationary knife 121. The stationary knife is substantially a triangular shaped member conforming to the V-shaped extension 120. The outer face of the stationary knife is provided with an arcuate beveled surface 122 and an annular recess 123 in the apex of the triangular end concentric with the beveled surface 122. An angular groove 125 is formed in the face of the knife extending radially from the upper edge adjacent the end of the feed tube 86 into the beveled portion 122. A vertical groove 126 is similarly formed in the face of the knife. The upper ends of the grooves 125 and 126 are flared somewhat as shown at 127.

A complemental movable knife 128 is provided with an annular boss 129 which is adapted to fit within the recess 123 to maintain the two knife members in co-acting relationship. A stud 130, as shown in Figure 9, is held permanently by pins 130A to movable knife 128. Stud 130 passes through apertures provided therefor in both knife members. Stud 130, being a permanent part of movable knife 128, rotates in the aperture of knife member 121. The movable knife 128 and stud 130 are held securely to stationary knife 121 and to triangular extension 120 by washer 131A and nut 131. This structure provides an unrestricted passage for the wire through the stud 130, as described later, regardless of the position of the knife 128.

The movable knife is also provided with an annular beveled surface 132 which conforms with and bears against the beveled surface 122 of the stationary knife 121. An aperture 133 is formed in the knife 128 and extends from the lower edge upwardly into the beveled surface 132. The edge of the aperture 133, where it meets the beveled surface 132, is adapted to register with and form with the edge of the groove 125 an angular shearing surface for the wire to be cut. Pivotal movement of the movable knife 128 will cause the portion of the aperture 133 to register with the groove 127 to form therewith a continuous aperture throughout the knife. An aperture 135 is provided in the stud 130 and is adapted to align with the aperture 133 when it is in both described positions to form an open passage for the cut wire and the plunger 47.

The two positions of the knife mentioned above may be called the wire cutting position and fastener positioning position. To cause the movable blade to assume either of these positions, it is provided with an upwardly extending arm 137 which terminates in an arcuate surface 138 and an angular edge 138'.

A predetermined length of wire is fed as described through the tube 86 and into the groove 125 and the upper portion of the aperture 133 of the knife 128. Movement of the knife 128 will carry this length of wire with it to its second position, shearing this length off from the remainder of the wire with an angular cut due to the beveled surfaces. Forming angular cuts on each end of the fastener, facilitates driving the fastener through the materials to be joined and makes it possible to more easily form the clinched ends. As the movable blade 128 moves to its vertical position, the length of wire is cut off and drops down to the bottom of the aperture into contact with the material to be fastened thereby being in a position to be driven by the plunger pin.

In Figure 3, it will be noted that the casting 31 is recessed as shown at 140 to accommodate the arm 137 of the movable knife 128. A trip lever 142 for the knife 128 is pivotally mounted in the recess at 143. A depending portion 144 of the lever 142 is adapted to engage the face 138 of the knife arm 137 and maintain the knife in the wire receiving position by means of a lateral extension 145 engaging the vertical edge 146 of the cam block 43. Upon downward movement of the plunger 40, the cam block 43 will disengage the extension 145 and the face 43' will engage the end 138 of the arm and move the same to a substantially perpendicular position aligning the aperture opening with the slot 126. Upon upward movement of the block 43, the upper end of the block will engage the portion 145 of the lever 142 and cause it to return the arm 137 and the movable knife 128 to their initial positions.

In Figures 3 and 5 it can be seen that the cross-head 113 is formed with an enlarged end 150 having a threaded bore 151. An exteriorly threaded sleeve 152 having an enlarged head 153 is adapted to be screwed into the bore 151. The head 153 has a reduced portion 154 which fits within a guide socket 155 formed in the upper portion of the enlarged end 150.

The upper end of the plunger 40 is reduced as shown at 156. The reduced portion 156 is adapted to extend through the bore of the sleeve 152 and a washer 157 is interposed between the upper end of the plunger and the bottom of the sleeve. The washer fits within a guide recess 158 formed in the enlarged end 150 of the cross-head. The upper end of the reduced end 156 is exteriorly threaded as shown at 159 and a cap 160 is screwed thereon. A friction washer 161 is positioned between the cap 160 and the enlarged head 153.

An operating handle 162 is suitably secured to the side of the cap 153 as shown in Figure 3 and a pin 163 is screwed into the cross-head 113 as shown at 164 to limit the movement of the handle 162.

It will be appreciated that the plunger rod can be either raised or lowered by movement of the handle 162 depending, of course, upon the direction of rotation of the handle. If the handle is rotated clockwise, the sleeve 152 will be screwed downwardly, thereby moving the plunger 40 downwardly making the countersink of the plunger point 47 deeper. On the other hand by moving the handle 162 counterclockwise, the sleeve 152 will be screwed upwardly, thereby moving the plunger rod 40 upwardly and making the counter-sink of the plunger point shallower.

Manifestly, the above described structure provides an arrangement for varying the depth of the counter-sink of the plunger point 47 which is simple in construction and operation and which possesses relatively few working parts. Also, it will always insure a complete stroke of the operating rod 20.

The horn or anvil 4 for supporting the material to be worked upon includes the sleeve 5 which is provided with a projection 170 which extends through an aperture 171 in the shelf 2. In Figure 12 it can be seen that a socket 172 is slidably fitted within the sleeve 5. A cup 173 is suitably secured to the bottom of the socket 172 and a coil spring 174 has one end positioned against the cup 173 and its opposite end against the sleeve 5. The spring 174 positioned between the stationary sleeve 5 and the cup 173 attached to the movable socket 172 will permit vertical movement of the socket 172 upon actuation of the arm 24, yet will retain the normal position of the socket when the horn is manually raised.

The horn 4 is also provided with an extension 175 which extends into the socket 172. As best shown in Figures 13 and 14, the extension 175 is provided with a vertical groove 176, and a plate 177 having rounded ratchet teeth 178 is secured therein by screws 179. The upper end of the socket 172 is formed with a collar 180 having a bifurcated portion 181. A lever arm 182 is pivotally mounted in the bifurcation by means of a screw 183. The inner end of the arm 182 is formed with a rounded projection 184 which is adapted to mesh with the rounded teeth 178. The rounded teeth 178 and the rounded projection 184 on the lever 182 afford a particularly desirable construction. When it is desired to lower the horn 4, by moving the lever 182 about its pivot to the broken line position shown in Figure 14 the rounded end 184 disengages itself from the teeth 178, and the extension 175 moves downwardly without the necessity of first rising even a fraction of an inch. This is particularly desirable in case the machine should hang while it is in operation and it should become necessary to lower the horn to remove the shoe and prevent damage to the plunger point 47.

A bleed hole 186 is formed in the bottom end of the socket 172 and the cap 173, thereby enabling the extension 175 to move slowly downward.

Briefly, the operation of the machine is as follows. When the required length of the fastener has been determined by the proper manipulation of the feeder adjusting mechanism 90 and the wire has passed through the feeding mechanism F and through the guide tube 85 with its end adjacent the upper edge of the knife K and the material to be joined is positioned on the horn 4, the foot treadle 18 is depressed. The downward movement of the treadle 18 will pull down the operating rod 20, the cross-head 113, the feeder arm 115 and the plunger 40. During this downward cycle of the operating rod 20, the arm 115 will engage the feeder cam 75, thus moving the feeding mechanism F and projecting the wire into the knife. The wire will be fed downwardly into the complemental slots 125 and 133, a distance which is equal to the downward stroke of the feeding mechanism F. At this point the cam surface of the plunger mechanism 40 will engage the area 138 of the arm 137 thus moving the arm to a perpendicular position and actuate the movable knife element 128. The movable knife will cause the cutting edges of the movable and stationary blades to effect a shearing of the wire and form the fastener. When the arm 137 has reached the limit of its movement, the aperture 125 carrying the fastener will register with the aperture 126 at which time the fastener will be in alignment with the plunger point 47. As the plunger point continues its downward movement it will pass through the apertures 133 and 135, expelling the fastener and inserting it into the materials to be joined.

Simultaneously with the initial downward movement of the control rod 20, the rod 22 also affixed to the foot treadle will pull down one end of the arm 24. When the arm 24 is moved downwardly, the roller 26 will bear against the cup 173 and the socket 172 and move the horn 4 upwardly toward the bottom area of the cutting mechanism, fixing the materials to be joined in proper position.

The action of each of the above-mentioned mechanisms occurs during the downward travel of the control rod and while it is moving from its initial position to the limit of its downward stroke. When pressure is removed from the foot treadle 18, the spring 21 will return the pedal and the control rod 20 to their initial positions and the machine is again ready for another operation.

Manifestly, from the foregoing description, it will be appreciated that there is provided an anvil or horn which can be quickly and easily adjusted to take care of any given situation. The use of the rounded teeth on the extension of the horn in conjunction with the rounded projection on the operating lever affords a highly desirable structure. For example, when it is desired to lower the horn by moving the lever about its pivot, the rounded end disengages itself from the rounded teeth and the extension moves downwardly without the necessity of first rising even a fraction of an inch. As previously indicated, this arrangement is particularly efficacious in the event the machine should hang during the operation and it is necessary to lower the horn to remove the shoe and complete the downward stroke of the plunger point.

Moreover, there is provided in the present application, a construction which is simple in structural detail and operation by which the feeding mechanism can be regulated.

Also, there is provided a simple construction whereby the depth of the counter-sink of the plunger point can be easily regulated.

While we have shown and described the preferred embodiment of our invention, we wish it to be understood that we do not confine ourselves to the precise details of construction herein set forth by way of illustration, as it is apparent that many changes and variations may be made therein, by those skilled in the art, without departing from the spirit of the invention, or exceeding the scope of the appended claims.

We claim:

1. In a machine for making and inserting metallic fasteners, a fixed sleeve, a movable sleeve within the fixed sleeve, a vertically movable horn, an extension for the horn adapted to project into the movable sleeve, teeth on the extension, a lever having a projection adapted to engage the teeth pivoted to the movable sleeve, said projection and teeth being formed so as to avoid any appreciable movement of the horn when the lever is moved about its pivot to move the projection out of engagement with the teeth.

2. In a machine for making and inserting metallic fasteners, a fixed sleeve, a movable sleeve within the fixed sleeve, a vertically movable horn, an extension for the horn adapted to project into the movable sleeve, rounded teeth on the extension, a lever having a rounded projection adapted to engage the teeth pivoted to the movable sleeve, said projection and teeth being formed so as to avoid any appreciable movement of the horn when the lever is moved about its pivot to move the projection out of engagement with the teeth.

CHARLES A. WATKINS.
JOHN G. WRIGHT.
CLIFFORD T. HARRIS.